United States Patent [19]
Persson et al.

[11] Patent Number: 5,858,174
[45] Date of Patent: Jan. 12, 1999

[54] PROCESS FOR THE PRODUCTION OF PAPER

[75] Inventors: Michael Persson, Göteborg; Joakim Carlén, Varberg; Hans Johansson, Kungälv, all of Sweden; Carlos Cordoba, Barcelona, Spain

[73] Assignee: Eka Chemicals AB, Bohus, Sweden

[21] Appl. No.: 676,763

[22] Filed: Jul. 8, 1996

Related U.S. Application Data

[60] Provisional application No. 60/001,242 Jul. 19, 1995.

[30] Foreign Application Priority Data

Jul. 7, 1995 [SE] Sweden .................................. 9502522

[51] Int. Cl.⁶ .................................................. D21H 21/10
[52] U.S. Cl. ..................................... 162/164.1; 162/164.3; 162/164.6; 162/168.1; 162/168.2; 162/168.3; 162/175; 162/181.1; 162/181.4; 162/181.6; 162/181.8; 162/181.5; 162/183
[58] Field of Search ............................ 162/164.1, 164.3, 162/164.6, 168.1, 168.2, 168.3, 175, 183, 181.1, 181.6, 181.8, 181.4, 181.5

[56] References Cited

U.S. PATENT DOCUMENTS

| | | | |
|---|---|---|---|
| 4,380,600 | 4/1983 | Hosoda et al. ........................... | 524/458 |
| 4,388,150 | 6/1983 | Sunden et al. ........................... | 162/175 |
| 4,749,444 | 6/1988 | Lorz et al. ............................ | 162/168.3 |
| 4,753,710 | 6/1988 | Langley et al. ........................ | 162/164.3 |
| 4,795,531 | 1/1989 | Sofia et al. ............................ | 162/168.3 |
| 4,927,498 | 5/1990 | Rushmere ............................ | 162/168.3 |
| 4,954,220 | 9/1990 | Rushmere ............................ | 162/168.3 |
| 4,961,825 | 10/1990 | Andersson et al. ...................... | 162/175 |
| 4,980,025 | 12/1990 | Andersson et al. .................. | 162/168.3 |
| 5,071,512 | 12/1991 | Bixler et al. ............................ | 162/175 |
| 5,127,994 | 7/1992 | Johansson et al. .................. | 162/168.3 |
| 5,176,891 | 1/1993 | Rushmere ............................ | 423/328.1 |
| 5,279,807 | 1/1994 | Moffett et al. .......................... | 423/338 |
| 5,368,833 | 11/1994 | Johansson et al. ..................... | 423/338 |
| 5,447,604 | 9/1995 | Johansson et al. .................. | 162/181.6 |
| 5,470,435 | 11/1995 | Rushmere et al. ................... | 162/181.6 |

FOREIGN PATENT DOCUMENTS

| | | | |
|---|---|---|---|
| 0 183 466 | 6/1986 | European Pat. Off. .......... | C08F 2/10 |
| 0 223 223 | 5/1987 | European Pat. Off. ......... | D21D 3/00 |
| 0 308 752 | 3/1989 | European Pat. Off. ......... | D21D 3/00 |
| 0 335 575 | 10/1989 | European Pat. Off. ....... | D21H 23/76 |
| 0 525 751 | 2/1993 | European Pat. Off. ........ | C08F 20/60 |
| 0 656 872 | 6/1995 | European Pat. Off. ...... | C01B 33/143 |
| WO 94/05595 | 3/1994 | WIPO ............................ | C01B 33/14 |
| WO 95/23021 | 8/1995 | WIPO .............................. | B01J 13/00 |

OTHER PUBLICATIONS

Abstract, NZ 140,574, Process For Dry–Strengthening Paper, Patent Office Journal, No. 1073, Oct. 1968.

*Primary Examiner*—Peter Chin
*Attorney, Agent, or Firm*—Ralph J. Mancini

[57] ABSTRACT

The invention relates to a process for the production of paper from a suspension of cellulose containing fibers, and optional fillers, comprising adding to the suspension a low molecular weight cationic organic polymer, a high molecular weight cationic or amphoteric polymer and anionic inorganic particles, forming and draining the suspension on a wire, wherein the low molecular weight polymer has a molecular weight below 700,000 and the high molecular weight polymer has a molecular weight above 1,000,000, said polymers being simultaneously added to the suspension. The invention further relates to a polymer mixture in the form of an aqueous dispersion comprising at least one high molecular weight cationic or amphoteric acrylamide-based polymer having a molecular weight above 1,000,000, at least one low molecular weight cationic organic polymer having a molecular weight below 700,000 and at least one water-soluble inorganic salt, the weight ratio of said high molecular weight polymer to said low molecular weight polymer being within the range of from 9:1 to 1:2.

20 Claims, No Drawings

PROCESS FOR THE PRODUCTION OF PAPER

The present application claims priority of Swedish application no. 9502522-7, filed Jul. 7, 1995 and benefit of U.S. Provisional patent application Ser. No. 60/001,242, filed Jul. 19, 1995.

The present invention relates to a process for the production of paper and, more particularly, to a process in which a low molecular weight cationic polymer, a high molecular weight charged polymer and anionic inorganic particles are added to a papermaking stock. The process provides improved drainage and retention.

BACKGROUND

It is known in the art to use systems of drainage and retention aids comprising high molecular weight (hereafter HMW) charged polymers and anionic inorganic particles, e.g. bentonite and silica based particles. These additives are introduced into the stock in order to facilitate drainage and increase adsorption of fine particles onto the cellulose fibers so that they are retained with the fibers. However, the efficiency of drainage and retention aids usually is deteriorated in stocks which have a high cationic demand due to the presence of interfering anionic substances. In the art, such substances are commonly referred to as anionic trash. The level of anionic trash usually is high in stocks based on recycled fibers and mechanically derived pulps. To counter the deteriorated performance of additives observed in such stocks, it is known to use low molecular weight (hereafter LMW) cationic polymers as anionic trash catchers which are initially added to the stock in order to neutralize the anionic trash and reduce the cationic demand, thereby enhancing the efficiency of drainage and retention aids subsequently added.

European Patent Application No. 0335575 discloses a process for the production of paper which comprises a preliminary polymer inclusion stage in which a LMW cationic polymer is added to a cellulosic suspension followed by addition of a main polymer selected from cationic starch or HMW cationic polymer and then an inorganic material selected from bentonite or colloidal silica.

European Patent Application No. 0308752 relates to a method for making paper which comprises the steps of adding to paper furnish a LMW cationic organic polymer and then colloidal silica and a HMW charged acrylamide copolymer having a molecular weight of at least 500,000.

THE INVENTION

According to the present invention it has been found that very good drainage and/or retention can be obtained with additives comprising LMW cationic polymer, HMW cationic and/or amphoteric polymer and anionic inorganic particles when the LMW cationic polymer and HMW cationic and/or amphoteric polymer are simultaneously added to the stock, in particular when using the LMW polymer and HMW polymer in the form of a mixture. This discovery is contrary to prior art techniques which emphasize the initial addition of LMW cationic polymers for obtaining adequate performance with subsequently added drainage and retention aids comprising HMW charged polymers and anionic inorganic particles. More specifically, the present invention relates to a process for the production of paper from a suspension of cellulose containing fibers, and optional fillers, which comprises adding to the suspension a low molecular weight cationic organic polymer, a high molecular weight cationic and/or amphoteric polymer and anionic inorganic particles, forming and draining the suspension on a wire, wherein the low molecular weight polymer has a molecular weight below 700,000; the high molecular weight polymer has a molecular weight above 1,000,000; and said polymers are simultaneously added to the suspension. The invention thus relates to a process as further defined in the claims.

The process according to the present invention results in improved drainage and/or retention compared to processes in which HMW cationic or amphoteric polymers are used as a sole polymer additive in conjunction with anionic inorganic particles. Furthermore, the present process results in improved drainage and/or retention compared to processes comprising pre-dosing LMW cationic polymer prior to adding HMW cationic and/or amphoteric polymers and anionic inorganic particles. Hereby the present invention makes it possible to increase the speed of the paper machine and to use lower dosages of additives to give the same drainage and/or retention effect, which lead to an improved papermaking process and economic benefits.

The polymers simultaneously added to the stock according to the invention comprise at least one high molecular weight charged polymer that functions as a drainage and/or retention aid. The HMW polymer can be selected from cationic polymers, amphoteric polymers or mixtures thereof. The use of such polymers as drainage and/or retention aids is known in the art. Preferred HMW polymers are water-soluble. Suitably at least one HMW cationic organic polymer is used. Generally, the cationicity of the HMW polymers can be within the range of from 1 to 100 mole %, suitably from 1 to 80 mole % and preferably from 1 to 60 mole %. The term "cationicity", as used herein, refers to the amount of cationic mer units present in the polymer. The charge density of the HMW polymer can be from 200 to 7,000 $\mu$eq/g of dry polymer. The HMW polymer can be derived from natural or synthetic sources, and it can be linear or branched. Examples of suitable polymers include cationic and amphoteric starches, guar gums, acrylamide-based and N-vinylamide-based polymers, polymers based on diallyldimethylammonium chloride and cationic polyethylene imines, polyamines and polyamideamines. Cationic starches, guar gums and acrylamide-based polymers are preferred HMW polymers. The molecular weight of the HMW polymer suitably is above 1,000,000 and preferably above 2,000,000. The upper limit is not critical; it can be about 50,000,000, usually 30,000,000 and suitably 25,000,000. However, the molecular weight of polymers derived from natural sources may be higher.

The polymers simultaneously added to the stock according to the invention further comprises at least one low molecular weight cationic organic polymer. Preferred polymers include water-soluble, highly charged LMW polymers which can have a cationicity of from 10 to 100 mole %, suitably from 20 to 100 mole % and preferably from 50 to 100 mole %. The charge density of the LMW polymer can be above 1,000 $\mu$eq/g, suitably above 2,000 $\mu$eq/g and preferably within the range of from 3,000 to 15,000 $\mu$eq/g of dry polymer. It is preferred that the LMW polymer has a higher cationicity and/or higher cationic charge density than the HMW polymer. Examples of suitable LMW cationic polymers include modified starches, e.g. degraded starch, polyamines, polyethylene imine, polyamideamine/-epichlorohydrin, dialkylamine/epichlorohydrin, homo- and copolymers based on monomers selected from diallyldimethylammonium chloride, vinyl amines, (meth)acrylamides and (meth)acrylates. Preferred LMW cationic polymers include polyamines, polyethylene imines, epichlorohydrin-based polymers and diallyldimethylammonium chloride-based polymers. The cationic monomers can be acid addition salts and/or quaternary ammonium salts. Examples of suitable (meth)acrylamides and (meth)acrylates include dialkylaminoalkyl (meth)acrylamides and dialkylaminoalkyl (meth)acrylates, preferably their quaternary ammonium salts. The moleclar weight of the LMW cationic polymer may depend on the type of polymer and its charge density. Suitably the molecular weight is below 700,000 and preferably below 500,000. The lower limit is usually 2,000 and preferably about 5,000.

The weight ratio of HMW polymer to LMW polymer added to the stock according to the invention can be varied over a broad range and it can be within the range from 30:1 to 1:20, usually from 20:1 to 1:20, suitably from 9:1 to 1:3, preferably from 7:1 to 1:2 and most preferably from 5:1 to 1:1.

The simultaneous addition to the stock of the HMW and LMW polymers according to the invention can be conducted at any position in the paper machine or stock preparation department. Hereby is meant that the polymers are added to the stock with substantially no time difference and essentially at the same position in the stock preparation department or paper machine prior to draining the stock on the wire. This means that the polymers can be added in the form of a mixture as well as separately, e.g. by adding one polymer during the addition of the other.

According to a preferred embodiment of the invention, the LMW cationic polymer in admixture with the HMW cationic and/or amphoteric polymer are added to the stock. The use of a polymer mixture and anionic inorganic particles according to the invention provides considerable improvements over prior art processes, in particular improved retention performance in stocks having a high cationic demand. The addition of a polymer mixture containing both LMW polymer and HMW polymer is further advantageous from an operational viewpoint since the number of polymer additions required can be reduced. Hereby it is possible to dispense with storage tanks, dosing equipment, control devices, etc., otherwise needed for polymer dosage, leading to a simplified papermaking process.

The polymer mixture of this embodiment can be prepared at any time prior to incorporating it into the stock, for example by mixing the polymers which may be in any state of aggregation, e.g. solids, solutions, emulsions, dispersions and mixtures thereof. When being added to the stock, the polymer mixture suitably is in a liquid form, e.g. in the form of an aqueous solution or dispersion.

In a preferred embodiment, use is made of a freshly prepared mixture of HMW polymer and LMW polymer, as defined above. Such a pre-mix can be formed by bringing an aqueous stream of HMW polymer into contact with an aqueous stream of LMW polymer and then introducing the resulting stream into the suspension. If desired, the streams can be mixed by means of any mixing device having at least two inlets into which separate streams of the polymers to be mixed are supplied and having at least one outlet through which the resulting mixture is passed and subsequently introduced into the stock.

The present invention further relates to a mixture of water-soluble polymers in the form of an aqueous dispersion containing at least one HMW polymer, at least one LMW cationic organic polymer and at least one water soluble inorganic salt, as further defined in the claims. The invention also relates to a method for its preparation. The polymer mixture provides improved drainage and/or retention when used in combination with anionic inorganic particles. In the polymer mixture according to the invention, the HMW polymer suitably is a cationic and/or amphoteric acrylamide-based polymer, preferably a cationic acrylamide-based polymer. The HMW polymer can have a cationicity ranging from 1 to 100 mole %, suitably from 1 to 80 mole % and preferably from 1 to 60 mole %, and it can have a charge density within the range of from 200 to 7,000 $\mu$eq/g of dry polymer. The molecular weight of the HMW polymer suitably is above 1,000,000 and preferably above 2,000,000. The upper limit is not critical; it can be about 50,000,000, usually 30,000,000 and suitably 25,000,000. The LMW cationic polymer preferably is a homo- or copolymer based on monomers selected from diallyldimethylammonium chloride, vinylamines, (meth)acrylamides, e.g. dialkylaminoalkyl (meth)acrylamides, (meth)acrylates, e.g. dialkylaminoalkyl (meth)acrylates, or mixtures thereof. The cationic monomers can be acid addition salts and/or quaternary ammonium salts, preferably quaternary ammonium salts. The LMW cationic polymer can have a cationicity within the range of from 10 to 100 mole %, suitably from 20 to 100 mole % and preferably from 50 to 100 mole %, and it can have a charge density above 1,000 $\mu$eq/g, suitably above 2,000 $\mu$eq/g and preferably within the range of from 3,000 to 15,000 $\mu$eq/g of dry polymer. It is preferred that the LMW polymer has a higher cationicity and/or higher cationic charge density than the HMW polymer. The weight ratio of HMW polymer to LMW polymer can be within the range of from 9:1, suitably from 7:1 and preferably from 5:1, to 1:2, suitably to 1:1 and preferably to 2:1. The aqueous dispersion of polymers can have a high dry polymer content, e.g. ranging from 5 to 75% by weight and suitably from 10 to 60% by weight.

In the polymer mixture according to the invention, it is preferred that the inorganic salt is an inorganic salt producing an aqueous phase in which the HMW polymer is insoluble. Examples of suitably salts include sodium sulfate, ammonium sulfate, magnesium sulfate, aluminum sulfate, sodium chloride, sodium dihydrogenphosphate, diammonium hydrogenphosphate and dipotassium hydrogenphosphate. Generally, polyvalent anion salts are preferred, e.g. the sulfates. The amount of water-soluble salt present in the polymer dispersions can be at least 2% by weight, based on the dispersion, and suitably the amount is within the range of from about 5% up to the limit of solubility of the salt, e.g. up to 50%.

The subject polymer mixture can be obtained by polymerization of water-soluble monomers intended for formation of the HMW polymer in an aqueous phase containing the LMW cationic polymer and the inorganic salt. Examples of suitable monomers include (meth)acrylamide, (meth)acrylamide-based monomers, e.g. dialkylaminoalkyl (meth)acrylamides, acid addition salts and quaternary ammonium salts thereof, (meth)acrylate-based monomers, e.g. dialkylaminoalkyl (meth)acrylates, acid addition salts and quaternary ammonium salts thereof, diallyldialkylammonium halides, e.g. diallyldimethylammonium chloride, and the like. The HMW polymer formed is precipitated in the aqueous phase due to the presence of the inorganic salt and the fine particles of HMW polymer so obtained are dispersed and stabilized in the aqueous phase by means of the LMW polymer. Generally, the polymerization of monomers in the presence of salt and polymeric dispersing agents is known in the art, for example from EP 0183466 and EP 0525751, and the present polymer mixture can be prepared according to the methods disclosed therein except that other polymers and/or weight ratios are used to produce the polymer mixture of the present invention.

The amount of polymers added to the stock according to the process of the present invention can be varied over a broad range depending on, among other things, the type of polymers used and if the polymers are utilized for further purposes. In addition to providing drainage and/or retention, the polymers may impart wet-strength and dry-strength to the cellulosic web or sheet produced. Examples of wet-strength improving polymer combinations include HMW cationic starch and cationic acrylamide-based polymer in combination with polyamideamine/epichlorohydrin. Usually, the total amount of polymers added is within the range of from 0.01 to 30 kg/ton, calculated as dry polymers on dry fibers and optional fillers. When using synthetic HMW polymers, e.g. cationic polyacrylamides, the total amount of polymers usually is at least 0.01 kg/ton, suitably from 0.02 to 15 kg/ton and preferably from 0.05 to 8 kg/ton. When using HMW polymers derived from natural sources such as those based on carbohydrates, e.g. cationic starch and cationic guar gum, the total amount of polymers usually is at least 0.05 kg/ton, calculated as dry polymers on dry fibers and optional fillers, suitably from 0.1 to 30 kg/ton and preferably from 1 to 20 kg/ton.

Anionic inorganic particles that can be used according to the invention include silica based particles, clays of the smectite type and titanyl sulphate sols. It is preferred that the particles are colloidal, i.e. in the colloidal range of particle size. It is preferred to use silica based particles, i.e. particles based on $SiO_2$, including colloidal silica, colloidal aluminum-modified silica or aluminum silicate, different types of polysilicic acid and mixtures thereof, either alone or in combination with other types of anionic inorganic particles. Suitable silica based particles include those disclosed in U.S. Pat. Nos. 4,388,150, 4,954,220, 4,961,825, 4,980,025, 5,127,994, 5,176,891, 5,368,833, 5,447,604, EP 0656872, and WO 95/23021, which are all hereby incorporated herein by reference.

The silica based particles suitably have a particle size below about 50 nm, preferably below about 20 nm and more preferably in the range of from about 1 to about 10 nm. The silica based particles suitably have a specific surface area above 50 $m^2/g$, preferably above 100 $m^2/g$, and suitably up to about 1700 $m^2/g$. The specific surface area can be measured by means of titration with NaOH according to the method described by Sears in Analytical Chemistry 28(1956):12, 1981–1983.

According to a preferred embodiment of the invention, the silica based particles have a specific surface area within the range of from 50 to 1000 $m^2/g$ and suitablty from 100 to 950 $m^2/g$. In a particularly preferred embodiment, use is made of a silica sol having an S-value within the range of from 8 to 45%, preferably from 10 to 30%, containing silica particles having a specific surface area within the range of from 750 to 1000 $m^2/g$, preferably from 800 to 950 $m^2/g$, which are surface-modified with aluminum to a degree of from 2 to 25% substitution of silicon atoms, as disclosed in U.S. Pat. No. 5,368,833. The S-value can be measured and calculated as described by Iler & Dalton in J. Phys. Chem. 60(1956), 955–957. The S-value indicates the degree of aggregate or microgel formation and a lower S-value is indicative of a higher degree of aggregation.

According to another preferred embodiment of the invention, use is made of a polysilicic acid having a high specific surface area, suitably above about 1000 $m^2/g$. In the art, polysilicic acid is also referred to as polymeric silicic acid, polysilicic acid microgel and polysilicate microgel, which are all encompassed by the term polysilicic acid. Suitably, the polysilicic acid has a specific surface area within the range of from 1000 to 1700 $m^2/g$, preferably from 1050 to 1600 $m^2/g$. Polysilicic acids that can be used according to the present invention include those disclosed in U.S. Pat. Nos. 4,388,150, 4,954,220, 5,127,994 and 5,279,807.

According to another preferred embodiment of the invention, use is made of colloidal aluminum-modified silica or aluminum silicate having a high specific surface area, suitably above about 1000 $m^2/g$. In the art, compounds of this type are also referred to as polyaluminosilicates and polyaluminosilicate microgels, which are both encompassed by the terms colloidal aluminum-modified silica and aluminum silicate used herein. Suitably, the specific surface area is within the range of from 1000 to 1700 $m^2/g$, preferably from 1050 to 1600 $m^2/g$. Examples of suitable high surface area silica based particles of this type include those disclosed in U.S. Pat. Nos. 4,961,825, 4,980,025, 4,927,498, 5,176,891 and 5,470,435.

Clays of the smectite type that can be used in the present process are known in the art and include naturally occurring, synthetic and chemically treated materials. Examples of suitable smectite clays include montmorillonite/-bentonite, hectorite, beidelite, nontronite and saponite, preferably bentonite and especially such which after swelling preferably has a surface area of from 400 to 800 $m^2/g$. Suitable bentonites and hectorites are disclosed in EP 0235893 and EP 0446205, respectively, which are both incorporated herein by reference. Suitable mixtures of silica based particles and smectite clays, preferably natural sodium bentonite, are disclosed in WO 94/05595 which is likewise incorporated herein by reference, wherein the weight ratio of silica based particles to clay particles can be in the range of from 20:1 to 1:10, preferably from 6:1 to 1:3. Useful titanyl sulphate sols are for example disclosed in EP 0148647.

The amount of anionic inorganic particles added to the suspension may vary within wide limits depending on, among other things, the type of particles used. The amount usually is at least 0.01 kg/ton and often at least 0.05 kg/ton, calculated as dry particles on dry fibers and optional fillers. The upper limit can be 10 kg/ton and suitably is 5 kg/ton. When using silica based particles, the amount suitably is within the range of from 0.05 to 5 kg/ton, calculated as $SiO_2$ on dry stock system, and preferably from 0.1 to 2 kg/ton.

In the present process it is preferred to add the polymers to the stock before the anionic inorganic particles, even if the opposite order of addition may be used. It is further preferred to add the first component, e.g. the polymers, before a shear stage which can be selected for example from pumping, mixing, cleaning, etc., and to add the second component, e.g. the anionic inorganic particles, after that shear stage. The present process further encompasses split additions, e.g. at least two positions for simultaneously adding the polymers, either separately or in admixture, and/or at least two positions for adding anionic inorganic particles, preferably with a shear stage between each addition. The high dewatering and retention effects observed with the additives of the invention can be obtained over a broad stock pH range. The pH can be in the range from about 3 to about 10, suitably above 3.5 and preferably within the range of from 4 to 9.

Additives which are conventional in papermaking such as, for example, stock sizes based on rosin, ketene dimers or alkenyl succinic anhydrides, dry strength agents, wet strength agents, aluminum compounds, etc., can of course be co-used in the process of the invention. The improved performance observed in the process of the present invention means that further benefits can be obtained, such as for example improved retention of such additives which can lead to improved sizing and strength of the paper. Aluminum compounds can be used to further improve drainage and/or retention in the present process. Examples of suitable aluminum compounds that can be used include alum, aluminates, aluminum chloride, aluminum nitrate and polyaluminum compounds, such as polyaluminum chlorides, polyaluminum sulphates, polyaluminum compounds containing both chloride and sulphate ions and polyaluminum silicate-sulphates. The suspension or stock can also contain mineral fillers of conventional types such as, for example, kaolin, china clay, titanium dioxide, gypsum, talc and natural and synthetic calcium carbonates such as chalk, grinded marble and precipitated calcium carbonate.

The process according to the invention can be used for producing cellulose fiber containing products in sheet or web form such as for example pulp sheets and paper. It is preferred that the present process is used for the production of paper. The term "paper", as used herein, of course include not only paper and the production thereof, but also other sheet or web-like products, such as for example board and paperboard, and the production thereof.

The process according to the invention can be used in the production of sheet or web-like products from different types of aqueous suspensions containing cellulosic fibers, or stocks, and the suspensions suitably contain at least 25% by weight and preferably at least 50% by weight of such fibers, based on dry substance. The suspensions can be based on fibers from chemical pulp such as sulphate and sulphite pulp, mechanical pulp such as thermomechanical pulp, chemo-thermomechanical pulp, refiner pulp and groundwood pulp, from both hardwood and softwood, and can also be based on recycled fibers from de-inked pulps, and mixtures thereof. It is preferred that at least 10o by weight and preferably at least 20% by weight of the pulp is derived from recycled fiber, de-inked pulp, coated broke or mechanical pulp or any mixture thereof. Such stocks, normally, have a high cationic demand and contains high levels of anionic trash which may be pulping residues, bleaching residues, de-inking residues, binders, inks, fillers, fines, sizes, dispersing agents and deposit control chemicals.

The invention is further illustrated in the following Examples which, however, are not intended to limit same. Parts and % relate to parts by weight and % by weight, respectively, unless otherwise stated.

EXAMPLE 1

In the following tests, drainage performance was evaluated by means of a Dynamic Drainage Analyser (DDA), available from Akribi, Sweden, which measures the time for draining a set volume of stock through a wire when removing a plug and applying a vacuum to that side of the wire opposite to the side on which the stock is present.

The furnish contained 54% of pulp based on a 60:40 mixture of bleached birch:pine sulphate refined to 200° CSF, 23% of grinded marble and 23% of coated broke (magazine paper) having an ash content of 30%. Stock volume was 800 ml, consistency 0.3% and pH about 7. The stock was stirred in a baffled jar at a speed of 1500 rpm throughout the test and chemical additions to the stock were conducted as follows: i) adding either HMW polymer used for comparison purposes or polymers according to the invention followed by stirring for 30 seconds, ii) adding anionic inorganic particles followed by stirring for 15 seconds, iii) draining the stock while automatically recording the drainage time.

A polymer mixture, herein designated M1, in the form of an aqueous dispersion of a HMW cationic polyacrylamide and a LMW cationic polyacrylate was used in the process of the invention. The polymer mixture was prepared by polymerization of acrylamide (90 mole %) and methacryloyloxyethyldimethylbenzylammonium chloride (10 mole %) to an average molecular weight of about 8 million in the presence of a homopolymer of acryloyloxyethyltrimethylammonium chloride having a molecular weight of about 10,000; deionized water; ammonium sulphate and a polymerization initiator. The resulting polymer mixture had a weight ratio HMW polymer to LMW polymer of 2.7:1, and a dry polymer content of about 18.5%. The polymer mixture was diluted to a dry polymer content of 0.1% prior to use.

Polymers used for comparison purposes were: P1) a HMW cationic polyacrylamide having a molecular weight of about 8 million; and P2) a HMW cationic polyacrylamide having a molecular weight of about 16 million. The polymers P1 and P2 were dissolved in water and used as 0.1% aqueous solutions.

The anionic inorganic material used was a silica based sol of the type disclosed in U.S. Pat. No. 5,368,833. The sol had an S-value of about 25% and contained silica particles with a specific surface area of about 900 $m^2/g$ which were surface-modified with aluminum to a degree of 5%. This sol is designated Sol 1. Sol 1 was added in an amount of 0.8 kg/ton, calculated as dry particles on dry stock system.

Table 1 shows the drainage time at varying dosages of P1, P2 and M1, calculated as dry polymer on dry stock system.

TABLE 1

| Polymer used | Drainage time [seconds] at polymer dosage of | | | |
| --- | --- | --- | --- | --- |
|  | 0.5 kg/ton | 0.8 kg/ton | 1.2 kg/ton | 2.0 kg/ton |
| P1 | 15.7 | 15.4 | 11.4 | 6.3 |
| P2 | 15.7 | 14.0 | 11.8 | 6.6 |
| M1 | 14.9 | 13.0 | 7.5 | 4.8 |

As can be seen from Table 1, the process using the mixture of LMW and HMW cationic polymers according to the invention resulted in improved drainage.

EXAMPLE 2

In this test series, retention was evaluated by means of the DDA used in Example 1 in combination with a nephelometer. First pass retention was evaluated by measuring the turbidity of the filtrate, the white water, obtained by draining the stock. The polymers and anionic inorganic particles according to Example 1 were similarly used in this test series.

Table 2 shows the retention effect measured as turbidity of white water obtained at varying dosages of P1, P2 and M1, calculated as dry polymer on dry stock system.

TABLE 2

| Polymer used | Turbidity [NTU] at polymer dosage of | | | |
| --- | --- | --- | --- | --- |
|  | 0.5 kg/ton | 0.8 kg/ton | 1.2 kg/ton | 2.0 kg/ton |
| P1 | 236 | 149 | 87 | 42 |
| P2 | 246 | 165 | 100 | 40 |
| M1 | 161 | 90 | 53 | 29 |

As can be seen from Table 2, the process according to the invention using a mixture of HMW and LMW cationic polymers resulted in markedly improved first pass retention.

EXAMPLE 3

Retention was evaluated as in Example 2, except that different polymers were used. The order of addition according to Example 1 was applied, unless otherwise indicated.

A polymer mixture designated M2 was prepared by dissolving the HMW cationic polyacrylamide P2 according to Example 1 in an aqueous solution of a LMW cationic polyamine having a molecular weight of 50,000, which is designated P3. M2 had a weight ratio P2 to P3 of 2.7:1.

Another embodiment of the invention was tested in which use was made of a freshly prepared mixture of P2 and P3. An aqueous solution of P2 was brought into contact with an aqueous solution of P3 by means of a mixing device, where the separate solutions were intimately mixed for about 2–3 seconds prior to introducing the resulting solution into the stock. The polymers were added in a weight ratio P2 to P3 of 2.7:1. This mixture is designated M3.

A further embodiment of the invention, designated S1, was tested in which P2 and P3 were separately but simultaneously added to the stock in a weight ratio P2 to P3 of 2.7:1.

P2 and P3 were also used for comparison purposes, where P3 was added to the stock followed by stirring for 120 seconds before adding P2. The polymers were used in an amount corresponding to a weight ratio P2 to P3 of 2.7:1. In Table 3, this test is designated P3+P2. In one test, P2 was also used as a single cationic polymer additive.

Table 3 shows the retention effect observed when adding 1.2 kg of total polymer and 0.8 kg of silica based particles per ton of dry stock system. As can be seen from Table 3, considerably improved retention was obtained with the processes according to the present invention.

TABLE 3

| | Total polymer addition, 1.2 kg/ton | | | | |
|---|---|---|---|---|---|
| | P3 + P2 | P2 | M2 | M3 | S1 |
| Turbidity [NTU] | 96 | 101 | 62 | 71 | 83 |

EXAMPLE 4

First pass retention was evaluated as in Example 3, except that other types of additives were used. The furnish was based on 80% of a 80:20 mixture of peroxide bleached thermomechanical pulp:stoneground wood pulp and 20% of the pulp according to Example 1. To the stock obtained were added 30% of china clay, based on dry substance, 4 g/l of sodium acetate trihydrate and 10 mg/l of extractives. Stock volume was 800 ml, consistency 0.15% and pH 5.5.

Polymer mixtures designated M4 and M5 were prepared by dissolving HMW cationic polyacrylamide P1 according to Example 1 in aqueous solutions of LMW polymers. The LMW polymer used in M4 was a cationic polyacrylamide having a molecular weight of about 100,000 and a cationic charge density of 2.9 meq/g, which is designated P4. M4 had a weight ratio P4 to P1 of 1:1. The LMW polymer used in M5 was a cationic starch having a molecular weight of about 400,000 and a cationic charge density of 2.5 meq/g, which is designated P5. M5 had a weight ratio P5 to P1 of 1:1.

The polymer mixtures were compared to prior art processes in which the polymers P1, P4 and P5 were separately added and where the LMW polymers were added to the stock followed by stirring for 30 seconds before adding P1. The weight ratios of P4:P1 and P5:P1 were both 1:1. These comparison tests are designated P4+P1 and P5+P1.

The anionic inorganic particulate materials used were Sol 1 according to Example 1 and a silica sol of the type disclosed in U.S. Pat. No. 4,388,150 which contained silica particles with a specific surface area of 500 m$^2$/g, which is designated Sol 2. The amount of Sol 1 and Sol 2 added was 3.0 and 6.0 kg/ton, respectively, calculated as dry particles on dry stock system.

Table 4 shows the retention effect, measured as turbidity, when using varying amounts of polymer, calculated as dry polymer on dry stock system, in combination with the sols.

TABLE 4

| Polymer used | Sol used | Turbidity [NTU] at polymer dosage [kg/ton] | | | | | | |
|---|---|---|---|---|---|---|---|---|
| | | 1.0 | 2.0 | 3.0 | 4.0 | 6.0 | 8.0 | 10.0 |
| P4 + P1 | Sol 1 | 100 | 72 | 50 | 44 | — | 16 | — |
| M4 | Sol 1 | 80 | 59 | 45 | 40 | — | 8 | — |
| P4 + P1 | Sol 2 | — | — | — | — | 37 | 30 | 32 |
| M4 | Sol 2 | — | — | — | — | 27 | 17 | 13 |
| P5 + P1 | Sol 1 | — | 62 | — | 42 | — | 13 | 13 |
| M5 | Sol 1 | — | 61 | — | 38 | — | 9 | 4 |

EXAMPLE 5

The procedure of Example 4 was followed except that different polymers were used. Cationic potato starch designated P6 was used as the HMW polymer and the polyamine P3 according to Example 3 was used as the LMW polymer. A polymer mixture designated M6 was obtained by mixing the polymers in the form of aqueous solutions in a weight ratio P6 to P3 of 5:1.

Table 4 shows the retention effect obtained with varying amounts of P3+P6 and M6, calculated as dry polymer on dry stock system, when the polymers were used in combination with Sol 1 added in an amount of 3.0 kg/ton.

TABLE 5

| Polymer used | Turbidity [NTU] at polymer dosage of | |
|---|---|---|
| | 18 kg/ton | 24 kg/ton |
| P3 + P6 | 28 | 27 |
| M6 | 20 | 18 |

EXAMPLE 6

Further cationic polymers and anionic inorganic particles were evaluated for retention performance by means of a Britt Dynamic Drainage Jar at a stirring speed of 1000 rpm, which is conventional in the art. The stock and polymers used in Example 4 were similarly used in this test series. The anionic inorganic particles used were a suspension of the type disclosed in WO 94/05595 containing silica based particles according to Example 1 and natural sodium bentonite in a weight ratio of 2:1, designated Susp 1, and a suspension of natural sodium bentonite, designated Susp 2. The amount of Susp 1 and Susp 2 added was 4.0 and 6.0 kg/ton, respectively, calculated as dry on dry stock system.

Table 6 set forth the first pass retention of fines and filler at varying polymer dosages, calculated as dry polymers on dry stock system.

TABLE 6

| Polymer used | Suspension used | Retention [%] at polymer dosage [kg/ton] | | | |
|---|---|---|---|---|---|
| | | 1 | 2 | 4 | 5 |
| P4 + P1 | Susp 1 | 26.1 | 32.2 | 56.7 | 70.5 |
| M4 | Susp 1 | 29.4 | 43.0 | 61.9 | 75.1 |
| P4 + P1 | Susp 2 | — | 43.5 | 43.5 | — |
| M4 | Susp 2 | — | 46.5 | 61.6 | — |

We claim:

1. A process for the production of paper which comprises providing a suspension of cellulose containing fibers, and optional fillers; adding to said suspension i) at least one low molecular weight cationic organic polymer having a molecular weight below 700,000 selected from the group consisting of modified starches, polyamines, polyethylene imine polyamideamine/-epichlorohydrin, dialkylamine/epichlorohydrin, homo-and copolymers based on monomers selected from diallyldimethyl ammonium chloride vinyl amines (meth acrylamides, and (meth) acrylates; ii) at least one high molecular weight cationic or amphoteric polymer drainage and/or retention aid having a molecular weight above 1,000,000 selected from the group consisting of cationic and amphoteric starches, guar gums, acrylamide-based polymers, N-vinylamide-based polymers, diallyldimethyl ammonium chloride-based polymers cationic polyethylene imines, polyamines and polyamedeamines; said low molecular weight and high molecular weight polymers being added in an amount of at least 0.01 kg/ton to 30 kg/ton, calculated as dry polymers on dry fibers and optional fillers, the weight ratio of said high molecular weight polymer to said low molecular weight polymer being within the range of from 30:1 to 1:20, wherein said low molecular weight polymer and said high molecular weight polymer are simultaneously added to the suspension at essentially the same position in the stock preparation or paper machine; and (iii) anionic inorganic particles selected from the group consisting of silica based particles, clays of the smectite type, titanyl sulphate sols, and mixtures thereof, said particles being added in an amount of at least 0.01 kg/ton, calculated as dry particles on dry fibers and optional fillers; and forming and draining the obtained suspension on a wire to form paper.

2. The process of claim 1, wherein the low molecular weight polymer and the high molecular weight polymer are added to the suspension in the form of a mixture.

3. The process of claim 1, wherein the low molecular weight polymer and the high molecular weight polymer are simultaneously but separately added to the suspension.

4. The process of claim 1, wherein the high molecular weight polymer is cationic starch, cationic guar gum or cationic acrylamide-based polymer.

5. The process of claim 1, wherein the low molecular weight cationic polymer is modified starch, polyamine, polyethylene imine, polyamideamine/epichlorohydrin, dimethylamine/epichlorohydrin or a homo- or copolymer based on monomers selected from diallyldimethyl ammonium chloride, vinylamines, (meth)acrylamides, or (meth) acrylates, or mixtures thereof.

6. The process of claim 5, wherein the low molecular weight cationic polymer is polyamine, polyethylene imine, polyamideamine/epichlorohydrin or dimethylamine/epichlorohydrin.

7. The process of claim 1, wherein the low molecular weight cationic polymer has a higher cationic charge density than the high molecular weight polymer.

8. The process of claim 1, wherein the low molecular weight polymer has a molecular weight within the range of from about 5,000 to about 500,000; and the high molecular weight polymer has a molecular weight above about 2,000,000.

9. The process of claim 1, wherein the weight ratio of high molecular weight polymer to low molecular weight polymer is within the range of from 9:1 to 1:3.

10. The process of claim 1, wherein the polymers are added in a total amount of from 0.01 to 30 kg/ton, calculated as dry polymers on dry fibers and optional fillers.

11. The process of claim 1, wherein the anionic inorganic particles are silica based.

12. The process of claim 11, wherein the silica based particles have a particle size within the range of from about 1 to about 10 nm.

13. The process of claim 11, wherein the silica based particles are colloidal silica, colloidal aluminum modified silica, aluminum silicate or polysilicic acid.

14. The process of claim 1, wherein the anionic inorganic particles are bentonite.

15. The process of claim 1, wherein the anionic inorganic particles are added in an amount of from 0.05 to 10 kg/ton, calculated as dry particles on dry fibers and optional fillers.

16. A process for the production of paper which comprises providing a suspension containing cellulosic fibers, and optional fillers; adding to said suspension
 (i) a low molecular weight cationic organic polymer having a molecular weight within the range of from 2,000 to 700,000 selected from the group consisting of polyamines, polyethylene imines, polyamideamine/epichlorohydrin, dialkylamine/epichlorohydrin, homo- and copolymers based on monomers selected from diallyl-dimethyl ammonium chloride, vinylamines, (meth)acrylamides, and (meth)acrylates, and mixtures thereof;
 (ii) a high molecular weight polymer having a molecular weight above 1,000,000 selected from the group consisting of cationic and amphoteric starches, cationic and amphoteric guar gums, cationic or amphoteric acrylamide-based polymers, and mixtures thereof; said low molecular weight and high molecular weight polymers being added in the form of a mixture or added separately but simultaneously at essentially the same position in the stock preparation or paper machine in an amount of from 0.01 to 30 kg/ton, calculated as dry polymers on dry fibers and optional fillers, the weight ratio of said high molecular weight polymer to said low molecular weight polymer being within the range of from 20:1 to 1:20, and
 (iii) anionic inorganic particles selected from the group consisting of colloidal silica, colloidal aluminum-modified silica, aluminum silicate, polysilicic acids, and mixtures thereof, the particles being added in an amount within the range of from 0.05 to 10 kg/ton, calculated as dry particles on dry fibers and optional fillers; forming and draining the obtained suspension on a wire to form paper.

17. The process of claim 16, wherein the high molecular weight polymer is a cationic acrylamide-based polymer.

18. The process of claim 16, wherein the high molecular weight polymer is cationic starch.

19. The process of claim 16, wherein the low molecular weight polymer has a higher cationicity and/or higher cationic charge density than the high molecular weight polymer.

20. The process of claim 16, wherein the polymers are added in the form of a mixture.

* * * * *

UNITED STATES PATENT AND TRADEMARK OFFICE
CERTIFICATE OF CORRECTION

PATENT NO. : 5,858,174
DATED : January 12, 1999
INVENTOR(S) : Carlen, J., et al.

It is certified that error appears in the above-indentified patent and that said Letters Patent is hereby corrected as shown below:

In Claim 1:

In line 10, "(meth acrylamides" should be "(meth) acrylamides

In line 16, please add a comma after "polymers"

In line 17, "polyamedeamines" should be "polyamideamines"

Signed and Sealed this

Twenty-eighth Day of September, 1999

Attest:

Attesting Officer

Q. TODD DICKINSON

Acting Commissioner of Patents and Trademarks